United States Patent
Qi et al.

(10) Patent No.: US 8,295,402 B2
(45) Date of Patent: Oct. 23, 2012

(54) OPTIMAL BLIND CHANNEL ESTIMATION FOR DQPSK DEMODULATION

(75) Inventors: Yihong Qi, Schaumburg, IL (US); Azzedine Touzni, Algonquin, IL (US)

(73) Assignee: QUALCOMM Incorporated, San Diego, CA (US)

( * ) Notice: Subject to any disclaimer, the term of this patent is extended or adjusted under 35 U.S.C. 154(b) by 1116 days.

(21) Appl. No.: 12/132,765

(22) Filed: Jun. 4, 2008

(65) Prior Publication Data

US 2009/0304113 A1 Dec. 10, 2009

(51) Int. Cl.
*H03K 9/00* (2006.01)
(52) U.S. Cl. ........ 375/316; 375/219; 375/329; 375/269; 375/260; 370/208
(58) Field of Classification Search ........... 375/316, 375/219, 329, 379, 260, 269; 719/760, 797; 370/208
See application file for complete search history.

(56) References Cited

U.S. PATENT DOCUMENTS

| | | | |
|---|---|---|---|
| 5,379,324 A * | 1/1995 | Mueller et al. | 375/340 |
| 6,590,945 B1 * | 7/2003 | Brardjanian et al. | 375/340 |
| 6,608,863 B1 * | 8/2003 | Onizawa et al. | 375/232 |
| 2002/0013881 A1 * | 1/2002 | Delp et al. | 711/105 |
| 2003/0007576 A1 | 1/2003 | Alavi et al. | |
| 2003/0169832 A1 * | 9/2003 | Schmidt et al. | 375/340 |

OTHER PUBLICATIONS

Chotikakamthorn et al., "On indentifiability of OFDM blind channel estimation," Proceeding of VTC 1999—Fall, Amsterdam, Netherlands 4:2358-2361 (Sep. 1999).
Li et al., "Subspace-based blind channel estimation for OFDM by exploiting virtual carriers," IEEE Transactions on Wireless Communications, 2(1):141-150 (Jan. 2003).
Muquet et al., "Blind and semi-blind channel identification methods using second order statistics for OFDM systems," Proceeding of IEEE ICASSP, 5:2745-2748 (1999).

* cited by examiner

*Primary Examiner* — Zewdu Kassa
(74) *Attorney, Agent, or Firm* — Charles Chesney

(57) ABSTRACT

An apparatus and method are described that provide an optimal blind channel estimation approach for a differential quadrature phase shift keying (DQPSK) modulation communication receiving system. The described blind channel estimation technique takes advantage of the characteristics of DQPSK constellations and the fact that estimates of relative channel phase distortion, and not absolute channel phase distortion, are sufficient for a DQPSK demodulation scheme. The described channel estimation approach provides low complexity, offers improved demodulation performance, and is theoretically optimal. It is particularly useful in existing DQPSK-based communications protocols that do not provide sufficient reference symbols for channel estimation.

23 Claims, 5 Drawing Sheets

OPTIMAL BLIND CHANNEL ESTIMATION FOR DQPSK DEMODULATION

FIELD OF THE INVENTION

The present invention relates to a method and apparatus for blind channel estimation, and more specifically to the optimal blind channel estimation for differential quadrature phase shift keying (DQPSK) modulation communication systems.

BACKGROUND ART

The need for high speed robust communications systems has grown dramatically in recent years. Such a demand has been fueled by the need to support various communications market segments, e.g., ever increasing numbers of voice calls, higher information transfer rates, better connectivity to the Internet. Both consumer and business market segments have witnessed unparalleled increases in growth, and such growth is predicted to continue for the foreseeable future. In theory, communications systems could accommodate the demand for increased data throughput by securing additional bandwidth over which to transmit. However, bandwidth is a limited resource and in most cases is limited by regulation. Accordingly, communication systems designers have sought to extract greater data throughput from existing bandwidth, either by using more efficient modulation schemes, or by overcoming practical limitations posed by the communications environment, e.g. the communications channel.

One difficulty with many communications systems is that the communications channel itself introduces amplitude and phase distortion, as well as noise contributions, into the transmitted signal. In order to improve the performance of a given communications system, it is necessary to remove the amplitude and phase distortion introduced by the communications channel. Accordingly, in order to mitigate the deleterious effects of the channel distortion, it is necessary to develop an estimate of the amplitude and phase distortion components introduced by the communications channel. Such an estimation process is called channel estimation.

Typically, channel estimation is performed using one of a variety of methods. While there are many differences between the various channel estimation methods available, many differences can be reduced to the fundamental tradeoff made between the complexity of the method and the performance of that method. Conceptually, outstanding channel estimation performance can be achieved, albeit at the expense of inordinately complex methods. In some cases, the complexity of such methods may be such that those methods cannot be reasonably implemented in practical communications systems.

In one traditional approach, known pilot symbols are transmitted such that the communications channel can be calibrated by the receiver. Pilot symbols are reference symbols that are known a priori by both the transmitter and the receiver such that a calibration process may be implemented. Upon receipt of the transmitted pilot symbols, this channel estimation algorithm analyses the received pilot symbols in order to generate an estimate of the distortion introduced by the communications channel.

An alternative channel estimation approach does not rely on the transmission of pilot symbols that are known a priori, but instead relies on certain known properties of the regular data signals transmitted by the communications system transmitter. For example, modulation schemes that use phase shift keying (PSK) rely on changes in phase of the signal carrier to capture the information required to be communicated. Accordingly, since the amplitude of the PSK-modulated signal is unaltered, the transmitted signal maintains a predictably fixed energy level. As such, channel estimation algorithms can be designed to capitalize on such known properties of the transmitted signal; in the case of PSK modulation-based communication systems, that known property is a fixed energy signal. Channel estimation techniques that do not use reference pilot symbols in the channel estimation process but rely on known properties of regular transmitted data signal are often referred to as "blind" channel estimation techniques.

Differential quadrature phase shift keying (DQPSK) modulation-based communication systems are widely used. In practice however, such systems do not attempt channel estimation due to the lack of sufficient reference symbols. In the research and academic literature, several blind channel estimation methods have been proposed. Most of these methods are based on second or higher order statistics, or the maximum likelihood (ML) principle. Selected references from the literature are listed as follows: B. Muquet and M. de Courville, "Blind and semi-blind channel identification methods using second order statistics for OFDM systems," Proceeding of IEEE ICASSP 1999, vol. 5, pp. 2745-2748; C. Li and S. Roy, "Subspace-based blind channel estimation for OFDM by exploiting virtual carriers," IEEE Transactions on Wireless Communications, vol. 2, no. 1, January 2003, pp. 141 150; N. Chotikakamthom and H. Suzuki, "On indentifiability of OFDM blind channel estimation," Proceeding of VTC 1999-Fall, Amsterdam, Netherlands, vol. 4, September 1999, pp. 2358-2361. One major drawback of these methods is the huge computational complexity, which make these methods not suitable to be implemented in practical systems. Therefore, what is needed is a blind channel estimation technique that has reliable performance and low computation complexity for a DQPSK-based modulation communications system.

BRIEF SUMMARY OF THE INVENTION

Embodiments of the current invention provide a novel approach to channel estimation for communication systems using differential quadrature phase shift keying (DQPSK) modulation. The DQPSK modulation technique is a major modulation technique and is commonly used in modern wireless communication systems. However, as noted above, practical DQPSK demodulation approaches do not attempt channel estimation due to a lack of sufficient reference symbols in this form of transmission.

It is an objective of the current invention to take advantage of certain characteristics of the DQPSK constellations and to thereby extract channel information from the received DQPSK data symbols in an optimum and low complexity manner. Specifically, it is an objective of the current invention to estimate the relative channel phase distortion with respect to a pre-determined constellation reference, but not to estimate the exact channel phase change as in the conventional channel estimation. The motivation for this novel approach is that, in DQPSK demodulation, only the phase difference of two adjacent symbols matters, and not the exact phases of those two symbols.

This novel approach has the following four advantages. Firstly, it significantly improves DQPSK demodulation performance. Typically, for a bit error rate (BER) of less than 0.07, a 1 dB to 3 dB improvement in signal-to-noise ratio (SNR) may be obtained over that obtained using the conventional approach where no channel estimation is attempted. Secondly, the method does not need pilot symbols. Therefore, this method can be directly applied to the DQPSK mode of existing communication standards such as Integrated Service Digital Broadcasting-Terrestrial (ISDB-T), which lack sufficient pilot symbols for channel estimation. Thirdly, the inventive approach features low computation complexity, which thereby facilitates practical implementation in real world communications systems. Finally, it can be shown that this novel approach is theoretically optimal in the sense that, as the number of received data symbols increases, the resulting channel estimates converge to the actual channel distortion and noise contributions.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
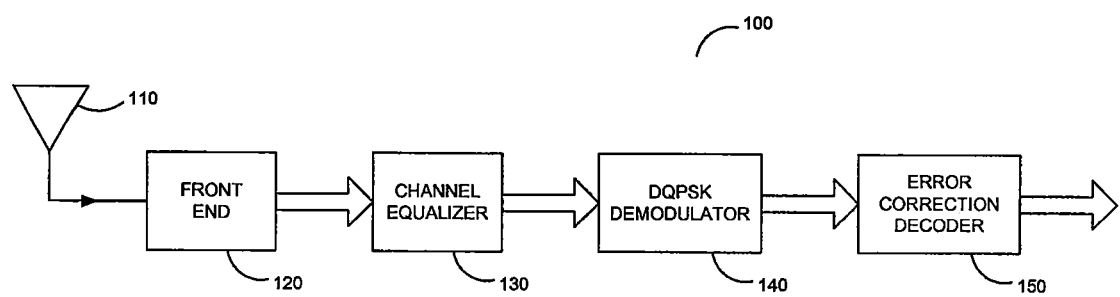
FIG. 1 is a block diagram of a DQPSK modulated communication receiving system in which an embodiment of the present invention is employed.

FIG. 1 is an illustration of a DQPSK modulated communications receiver to which embodiments of the current invention may be employed. A typical communications receiver 100 comprises an antenna 110, a front end 120, a channel equalizer 130, a demodulator 140, and an error correction decoder 150. A communications signal that has passed through a communications channel from transmitter to receiver is captured by the antenna 110, and is turn coupled to the receiver's front-end 120. The front-end 120 provides one or more of the following functionalities: gain, down-conversion, filtering, and digitization. In addition, it may provide fast Fourier transform functionality. The front-end 120 is in turn coupled to the channel equalizer 130. The channel equalizer 130 operates to reverse the effects of the channel distortion. The demodulator 140, coupled to channel equalizer 130, demodulates the signal to retrieve the underlying information content from the signal. Finally, the demodulator 140 is coupled to the error correction decoder 150, which is in turn coupled to the output of the receiver. The error correction decoder 150 reverses the functionality of its corresponding encoder in the transmitter.

Embodiments of the invention are realized within the channel equalizer 130. The approach described herein can be applied to any communications receiver using a DQPSK demodulation scheme. Accordingly, as a subset, the invention has applicability to multi-carrier systems that employ DQPSK modulation schemes (e.g. orthogonal frequency division multiplexing (OFDM) systems) that employ DQPSK modulation schemes, as well as to single carrier communications systems. The following communications standards employ DQPSK modulation techniques and are therefore particularly suited to benefit from an application of this invention. The Integrated Services Digital Broadcasting-Terrestrial (ISDB-T) standard is a Japanese digital television standard that regulates the transmission of a high-definition television channel and a mobile phone channel within a 6 MHz bandwidth that had been reserved originally for television transmissions. The Digital Audio Broadcasting (DAB) standard (also known as Eureka 147), regulates a digital technology for broadcasting radio stations, particularly in Europe. The Digital Multimedia Broadcasting (DMB) standard regulates digital radio transmission systems for sending multimedia (radio, TV, and datacasting) to mobile devices such as mobile phones. The DMB standard is available in two forms, namely the satellite version (S-DMB) and the terrestrial version (T-DMB). The HomePlug 1.0 standard is a home networking technology standard that connects devices to each other through the power lines in a home. Devices that can be connected using the HomePlug 1.0 standard include PCs, Macs, and other devices that use Ethernet, universal serial bus (USB), and IEEE 802.11 connectivity standards. Finally, the Brazilian Digital Television System standard (SBTVD), a digital television standard for Brazil based on the ISDB-T standard, also uses DQPSK modulation techniques and is therefore able to benefit from an application of various embodiments of this invention. Note that this list is not an exhaustive set of standards, but are merely provided as examples of the wide application for which embodiments of the invention may be found to thrive.

Embodiments of the invention may be used in both a wired and in a wireless communications system, although the benefits realized by channel estimation are typically greater in a wireless communications system where the channel effects are more pronounced. Embodiments of the invention may be used in static channel situations, as well as slow time-varying channel situations, although the benefits of this approach are superior in the case of a static channel, as the following analysis illustrates.

Figure 2A:
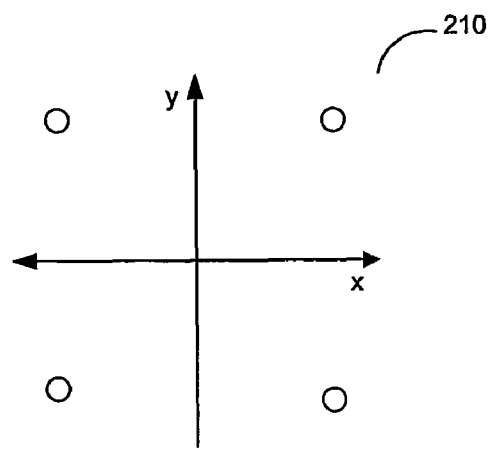
FIG. 2A is a constellation diagram pertaining to a DQPSK modulation scheme.
Figure 2B:
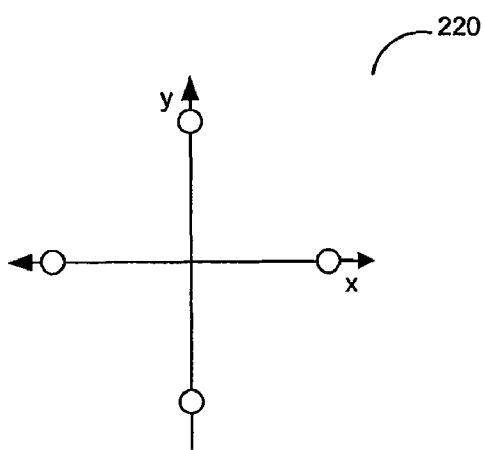
FIG. 2B is another constellation diagram pertaining to a DQPSK modulation scheme.
Figure 2C:
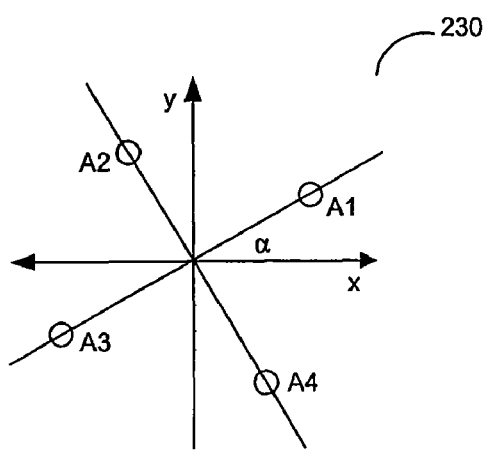
FIG. 2C is a constellation diagram pertaining to received DQPSK demodulated symbols, where the distortion of a communications channel is shown.

In an "ideal world", a DQPSK modulated symbol can take one of the values of the constellations ($e^{j\pi/4}$, $e^{j3\pi/4}$, $e^{-j3\pi/4}$, $e^{-j\pi/4}$) or ($e^{j\pi/2}$, $-1$, $e^{-j\pi/2}$, 1), corresponding to the first and second constellations as shown in FIG. 2A and FIG. 2B, respectively. For simplicity, and without loss of generality, only the second constellation ($e^{j\pi/2}$, $-1$, $e^{-j\pi/2}$, 1) is considered here, because the first constellation ($e^{j\pi/4}$, $e^{j3\pi/4}$, $e^{-j\pi/4}$, $e^{-j\pi/4}$) can be rotated by $e^{j\pi/4}$ so that is becomes the second constellation ($e^{j\pi/2}$, $-1$, $e^{-j\pi/2}$, 1). However, when "real world" channel distortion H $e^{j\alpha}$ is taken into account, the constellation of real world symbols is changed to H $e^{j\alpha}$ ($e^{j\pi/2}$, $-1$, $e^{-j\pi/2}$, 1), which are represented by ($A_1$, $A_2$, $A_3$, $A_4$), as shown in the third constellation in FIG. 2C. When noise distortion is also incorporated, the analytical representations of $A_1, A_2, A_3, A_4$ become:

$$A_1 = H \cos \alpha + jH \sin \alpha + n_1; \quad (1)$$

$$A_2 = -H \sin \alpha + jH \cos \alpha + n_2; \quad (2)$$

$$A_3 = -H \cos \alpha - jH \sin \alpha + n_3; \quad (3)$$

and $$A_4 = H \sin \alpha - jH \cos \alpha + n_4; \quad (4)$$

where $n_1$, $n_2$, $n_3$, and $n_4$ represent the noise contributions. These noise contributions are represented mathematically as independent Gaussian variables with a zero mean and a variance of $\sigma^2$.

Using N received DQPSK symbols $(a_1, a_2, \ldots, a_N)$, each taking one of the complex values of the set $(A_1, A_2, A_3 \text{ or } A_4)$, the channel estimation may be accomplished as follows. Three parameters need to be estimated, namely the relative channel phase change $\alpha$ with respect to the constellation $(e^{j\pi/2}, -1, e^{-j\pi/2}, 1)$ (see the third constellation of FIG. 2), the channel amplitude H, and the noise variance $\sigma^2$. Note that, without loss of generality, values for the angle $\alpha$ lie in the range $(0, \pi/2)$.

Firstly, estimates of three intermediate variables of $S_{sc}$, $S_{s2}$, and $S_{c2}$ are accumulated. The accumulations proceed as follows.

Initially, the three intermediate variables of $S_{sc}$, $S_{s2}$, and $S_{c2}$ are set to zero at an initialization step. Thereafter, for each received symbol $a_i$, if the received symbol falls into the first or third quadrants (i.e. the mathematical product of real($a_i$) and imag($a_i$) is greater than 0), then the three intermediate variables of $S_{sc}$, $S_{s2}$, and $S_{c2}$ are incremented as follows:

$$S_{sc} + \text{real}(a_i) \cdot \text{imag}(a_i) \to S_{sc}, \quad (5)$$

$$S_{c2} + [\text{real}(a_i)]^2 \to S_{c2}, \quad (6)$$

$$S_{s2} + [\text{imag}(a_i)]^2 \to S_{s2}, \quad (7)$$

Otherwise, if the received symbol $a_i$ falls into the second or fourth quadrants (i.e. the mathematical product of real($a_i$) and imag($a_i$) is less than or equal to 0), then the three intermediate variables $S_{sc}$, $S_{s2}$, and $S_{c2}$ are incremented as follows:

$$S_{sc} - \text{real}(a_i) \cdot \text{imag}(a_i) \to S_{sc}, \quad (8)$$

$$S_{c2} + [\text{imag}(a_i)]^2 \to S_{c2}, \quad (9)$$

$$S_{s2} + [\text{real}(a_i)]^2 \to S_{s2}, \quad (10)$$

where real($a_i$) and imag($a_i$) represent the real and imaginary parts of the complex value $a_i$, respectively. All of the received symbols, $a_i$, for i=1, 2, . . . , N, are processed in a similar manner to generate cumulative values for the three intermediate variables $S_{sc}$, $S_{s2}$, and $S_{c2}$.

For large N where the implications of the central limit theorem are realized, it may be shown that the normalized form of the three intermediate values, namely $S_{sc}/N$, $S_{s2}/N$, and $S_{c2}/N$ approach the following values:

$$S_{sc}/N = H^2 \sin \alpha \cos \alpha, \quad (11)$$

$$S_{c2}/N = H^2 \cos^2 \alpha + \sigma^2, \quad (12)$$

$$S_{s2}/N = H^2 \sin^2 \alpha + \sigma^2. \quad (13)$$

Through a straightforward trigonometric manipulation, an estimate $\hat{\alpha}$ of the phase $\alpha$ may be estimated by an evaluation of $\cot 2\hat{\alpha}$, as follows:

$$\cot 2\hat{\alpha} = \frac{S_{c2} - S_{s2}}{2 S_{sc}}, \quad (14)$$

Finally, estimates $\hat{H}$ and $\hat{\sigma}^2$ of the remaining two unknowns of the channel distortion, namely the amplitude H and the noise variance $\sigma^2$ respectively, may be determined as follows:

$$\hat{H}^2 = \sqrt{(S_{c2}/N - S_{s2}/N)^2 + (2 S_{sc}/N)^2}, \quad (15)$$

and $$\hat{\sigma}^2 = (S_{c2}/N + S_{s2}/N - \hat{H}^2)/2. \quad (16)$$

As would be appreciated by those in the relevant art, the above equations may be written using a variety of alternate, but equivalent, notations, trigonometric and algebraic terms. For example, a reorganization of these basic equations may lead to a different number of intermediate variables, or to a scaling of the intermediate variables based on N, etc. Such alternate expressions are considered within the scope of the current invention. In particular, since the angle $\alpha$ is defined with respect to an arbitrary reference point, equations that reflect the addition (or subtraction) of an arbitrary angle in the constellation plane are considered equivalent to those equations above, and are therefore considered to be within the scope of the current invention.

As noted above, this approach to channel estimation is in fact optimal in the sense that the estimates of channel effects generated by this approach converge to the actual channel effects when large enough numbers of symbol samples are used in the estimation process. For a given sample size N, the variable $\sigma^2$ used in equations (12) and (13) is more correctly written as a function of the symbol sample size N. i.e. $\sigma^2_N$, which is a random variable. Therefore, the equalities of equations (14) and (15) are approximate equalities due to the statistical nature of the random variable $\sigma^2_N$. However, as N becomes large enough for the central limit theorem to apply, $\sigma^2_N$ approaches a fixed value $\sigma^2$, and the approximate equalities of equations (14) and (15) becomes equalities. Accordingly, the difference between the actual value of $\alpha$ and its estimate $\hat{\alpha}$ becomes negligible and the optimal nature of this approach is revealed. A similar analysis applies to the convergence of the estimate $\hat{H}$ to the actual value H.

It is noted that the estimate of the phase component of the channel distortion, $\alpha$, generated by this method is based on the phase difference with respect to a pre-determined constellation reference, in this case the constellation $(e^{j\pi/2}, -1, e^{-j\pi/2}, 1)$. Note that this differs from a conventional channel estimation approach, wherein an estimate is made of the exact phase change resulting from channel distortion. Accordingly, the validity of the approach used in the current invention requires that the modulation scheme use differential modulated symbols wherein the phase difference of two adjacent symbols (and not the exact phases of those symbols) represents the information content.

Figure 3:
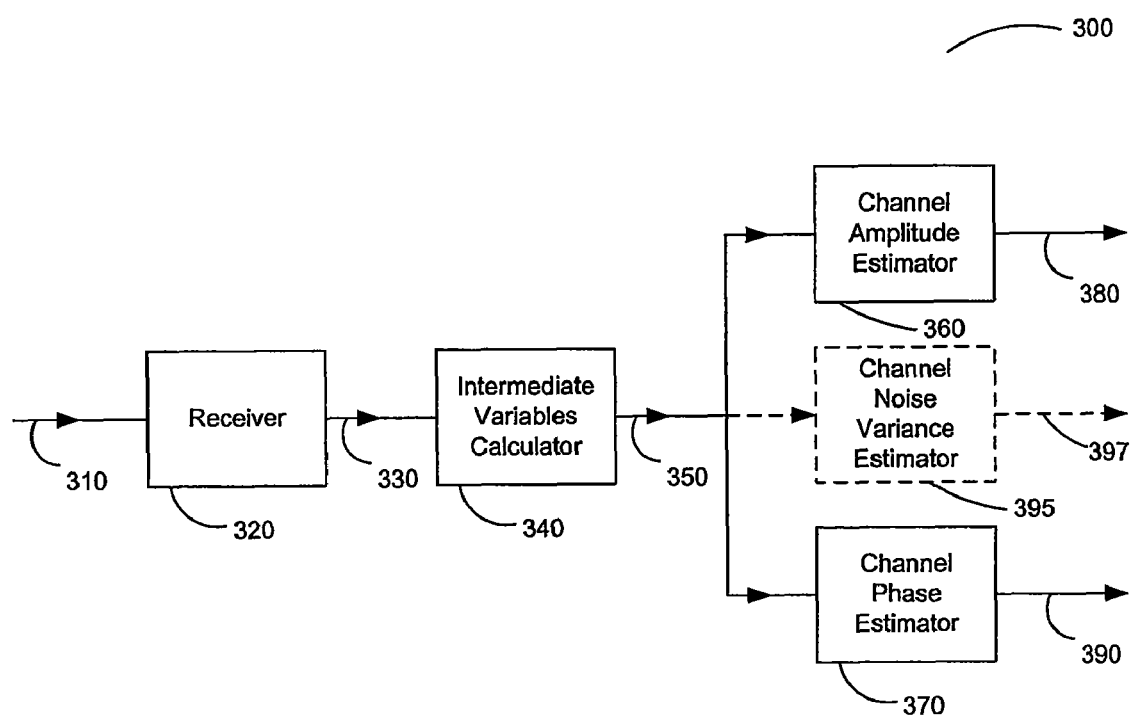
FIG. 3 is a block diagram of an embodiment of the current invention for optimal blind channel estimation for DQPSK modulation.

FIG. 3 is a block diagram of an embodiment of an apparatus for optimal blind estimation of the distortion of a communications channel when DQPSK demodulation is being used. A receiver module 320 receives DQPSK signals 310 and outputs a sequence of DQPSK symbols 330. The DQPSK symbols 330 are in turn coupled to the input of an intermediate variables calculator 340, which computes intermediate variables 350 that are in accordance with the equations above (or their equivalents), i.e. they are the accumulated sum of a specific function of the real component and the imaginary component of each DQPSK symbol, as shown in equations (5)-(10). The intermediate variables 350 are in turn coupled to the input of a channel amplitude estimate 360 and the input of a channel phase estimate 370. The channel amplitude estimator 360 outputs an estimate 380 of the channel amplitude, based on the equations above (11)-(16). The channel phase estimator 370 outputs an estimate 390 of the channel phase, also based on the equations (11)-(16). Optionally, a channel noise variance estimator 395 may be coupled to the intermediate variables 350. In a similar fashion to the other estimators, the channel noise variance estimator 395 outputs an estimate 397 of the channel noise variance, based on the equations above (11)-(16). The boundaries of these functional blocks are arbitrary, and alternate boundaries fall within the scope of this approach so long as the specified functions and relationships satisfy, or are equivalent, to that described above.

Note that these functional blocks, or their equivalents, can be implemented in hardware, software, firmware, or a combination thereof. If implemented in firmware, such functionality can be stored in a memory (e.g., PROM) and executed by a digital signal processor (DSP) or a general purpose microprocessor. If implemented in hardware, such hardware can include one or more of the following: discrete logic circuitry, application specific integrated circuits (ASICs), programmable gate arrays (PGAs), and field programmable gate arrays (FPGAs).

Figure 4:
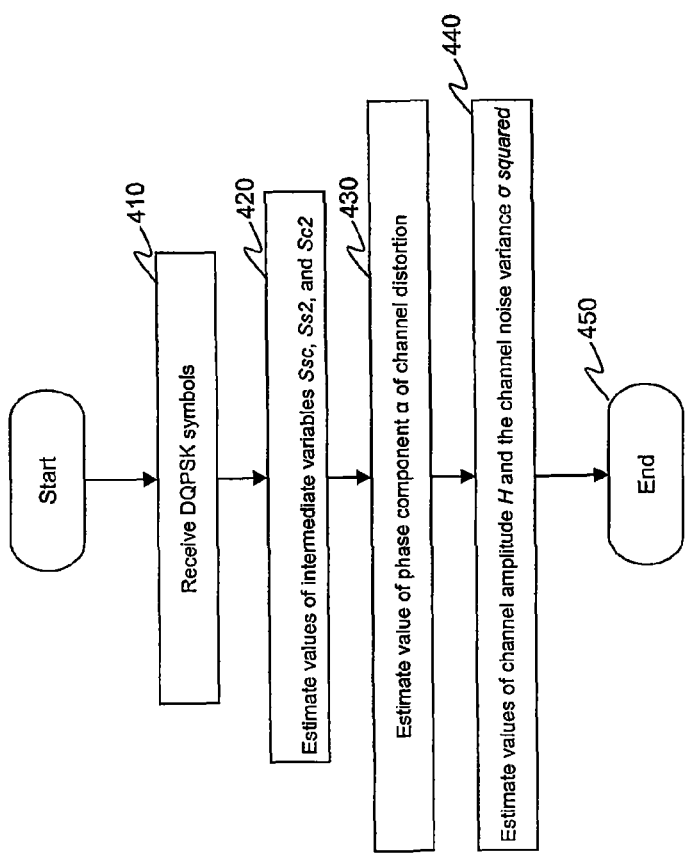
FIG. 4 is a flow chart of an embodiment of the inventive method for blind channel estimation of a DQPSK communication receiving system.

FIG. 4 is a flow chart of an embodiment of the above method 400 for blind estimation of a communications channel using a DQPSK demodulation communication receiver. In method 400, at a step 410, the N received symbol data on a carrier are input to the channel estimator. At a step 420, estimations are made for the intermediate variables, $S_{sc}$, $S_{s2}$, and $S_{c2}$. At a step 430, estimates are made of the phase component α of the channel distortion. At a step 440, estimations are made of the channel amplitude H and the noise variance $\sigma^2$. Finally, at a step 450, the method ends.

Figure 5:
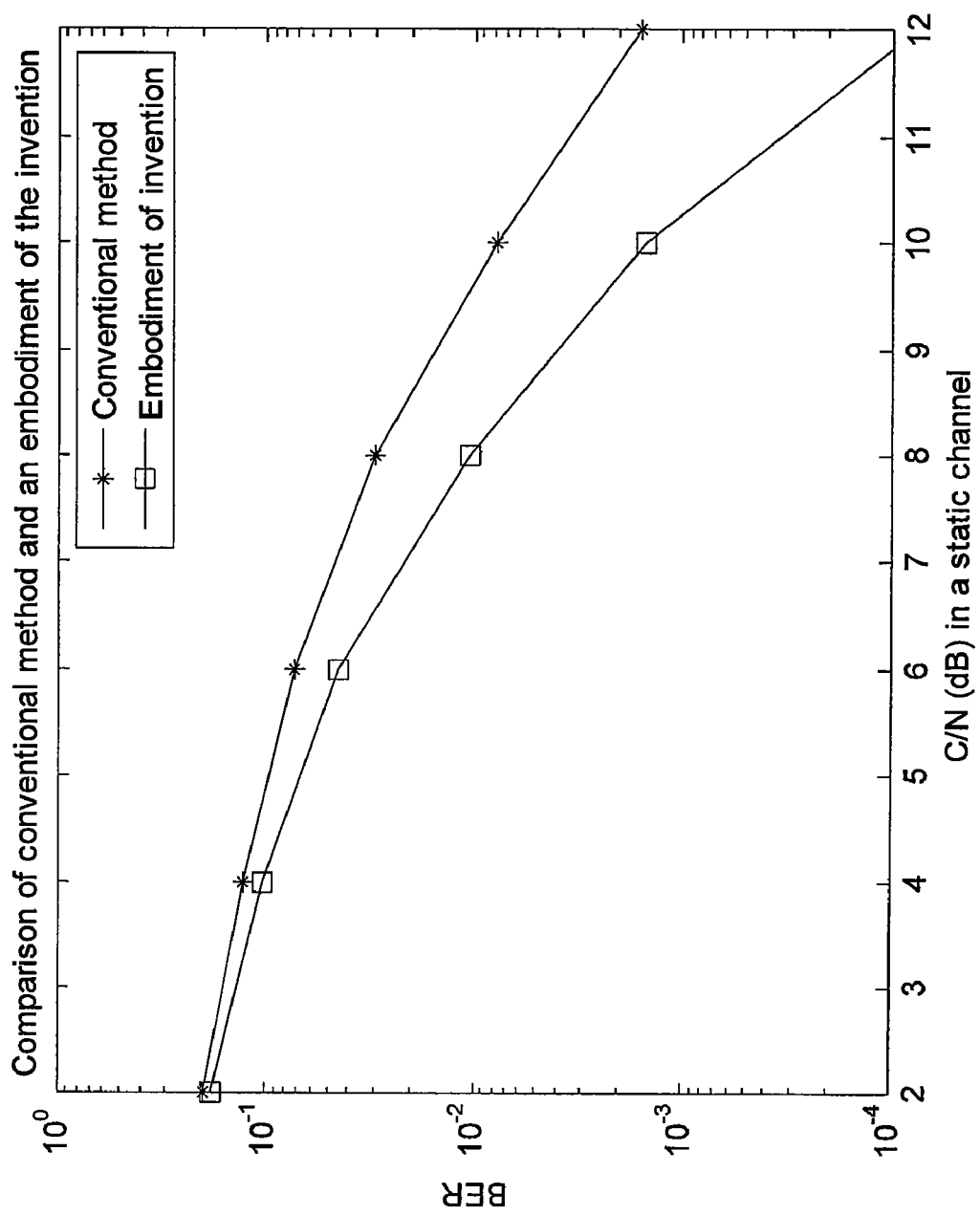
FIG. 5 is a comparison of the bit error rate of a conventional approach with that of an embodiment of the current invention for a static communications channel.

An illustrative comparison of the performance of one embodiment of the present invention versus the performance of a conventional approach is shown in FIG. 5 for the situation of a static channel. As noted earlier, the conventional approach to a DQPSK demodulation does not attempt any form of channel estimation. The illustration highlights a significant performance improvement in that for a bit error rate (BER) of less than 0.07, the SNR obtained by this method is 1 dB to 2 dB lower than that of the conventional method, assuming typical conditions found in practical DQPSK communications systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments reveals the general nature of the invention that others can, by applying knowledge within the skill of the art, readily modify and/or adapt for various applications, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It should be noted that the simulation, synthesis and/or manufacture of the various embodiments of this invention may be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:
1. An apparatus, comprising:
an intermediate variables calculator having a symbol input and an output, wherein the symbol input is adapted to accept a plurality of DQPSK symbols that are each characterized by a real component and an imaginary component, and wherein said intermediate variables calculator is adapted to output three intermediate variables that are each based on one or more second order products of the real components and the imaginary components of the DQPSK symbols, wherein each of the second order products is a second order product of the real component of a DQPSK symbol and the imaginary component of the same symbol;
a channel amplitude estimator coupled to the intermediate variables calculator and adapted to output an estimate of the channel amplitude that is responsive to the intermediate variables;
a channel phase estimator coupled to the intermediate variables calculator and adapted to output an estimate of the channel phase that is responsive to the intermediate variables; and
a channel noise variance estimator coupled to the intermediate variables calculator and adapted to output an estimate of the channel noise variance that is responsive to the three intermediate variables.

2. The apparatus of claim 1, wherein the intermediate variables calculator comprises:
a first accumulator coupled to the symbol input and to the output of the intermediate variables calculator, wherein said first accumulator is adapted to add to its output the sum of the absolute value of the product of the real component and the imaginary component of each DQPSK symbol;

a second accumulator coupled to the symbol input and to the output of the intermediate variables calculator, wherein said second accumulator is adapted to add to its output the sum of the square of the real component of each DQPSK symbol if the product of the real component and the imaginary component of that DQPSK symbol is greater than zero, otherwise to add to its output the sum of the square of the imaginary component of that DQPSK symbol; and a third accumulator coupled to the symbol input and to the output of the intermediate variables calculator, wherein said third accumulator is adapted to add to its output the sum of the square of the imaginary component of each DQPSK symbol if the product of the real component and the imaginary component of that DQPSK symbol is greater than zero, otherwise to add to its output the sum of the square of the real component of that DQPSK symbol.

3. The apparatus of claim 2, wherein the channel amplitude estimator estimates the channel amplitude by dividing the square root of the number of DQPSK symbols into the fourth root of the sum obtained by taking the square of the difference of the output of the second accumulator and the output of the third accumulator, and then adding four times the square of the output of the first accumulator to form said sum.

4. The apparatus of claim 2, wherein the channel phase estimator estimates the channel phase by taking the one-half of the inverse cotangent of the quotient obtained by taking the difference between the output of the second accumulator and the output of the third accumulator, and then dividing that difference by twice the output of the first accumulator to form said quotient.

5. The apparatus of claim 1, wherein the intermediate variables calculator comprises:
    a first accumulator coupled to the symbol input and to the output of the intermediate variables calculator, wherein said first accumulator is adapted to add to its output the sum of the absolute value of the product of the real component and the imaginary component of each DQPSK symbol;
    a second accumulator coupled to the symbol input and to the output of the intermediate variables calculator, wherein said second accumulator is adapted to add to its output the sum of the square of the real component of each DQPSK symbol if the product of the real component and the imaginary component of that DQPSK symbol is greater than zero, otherwise to add to its output the sum of the square of the imaginary component of that DQPSK symbol; and
    a third accumulator coupled to the symbol input and to the output of the intermediate variables calculator, wherein said third accumulator is adapted to add to its output the sum of the square of the imaginary component of each DQPSK symbol if the product of the real component and the imaginary component of that DQPSK symbol is greater than zero, otherwise to add to its output the sum of the square of the real component of that DQPSK symbol.

6. The apparatus of claim 5, wherein the channel amplitude estimator estimates the channel amplitude by dividing the square root of the number of DQPSK symbols into the fourth root of the sum obtained by taking the square of the difference of the output of the second accumulator and the output of the third accumulator, and then adding four times the square of the output of the first accumulator to form said sum.

7. The apparatus of claim 6, wherein the channel noise variance estimator estimates the channel noise variance by summing the output of the third accumulator with the output of the second accumulator, dividing that sum by the number of DQPSK symbols, subtracting the square of the channel amplitude estimator output, and dividing that difference by two.

8. The apparatus of claim 1, wherein the DQPSK symbols are obtained from a multi-carrier communications system.

9. The apparatus of claim 8, wherein the multi-carrier communications system is an orthogonal frequency division multiplexing (OFDM) system.

10. The apparatus of claim 1, wherein the DQPSK symbols are obtained from at least one of an Integrated Service Digital Broadcasting-Terrestrial (ISDB-T) compliant system, a Digital Audio Broadcasting (DAB) compliant system, a Digital Multimedia Broadcasting (DMB) compliant system, a HomePlug compliant system, and a Brazilian Digital Television System (SBTVD) compliant system.

11. The apparatus of claim 1, wherein each of the one or more second order product is a second order product of the real component of one of the DQPSK symbols and the imaginary component of the same DQPSK symbol.

12. The apparatus of claim 1, wherein the channel phase estimator is adapted to estimate a relative channel phase distortion with respect to a constellation reference of the DQPSK symbols.

13. A method of channel estimation implemented in an apparatus, comprising:
    estimating a channel amplitude value using a plurality of received DQPSK symbols, wherein the received DQPSK symbols are each characterized by a real component and an imaginary component, and wherein said estimating a channel amplitude value is based in part on three intermediate variables that are each based on one or more second order products of the real components and the imaginary components of the received DQPSK symbols, wherein each of the second order products is a second order product of the real component of a DQPSK symbol and the imaginary component of the same symbol;
    estimating a channel phase value based in part on the one or more second order products of the real components and the imaginary components of the received DQPSK symbols; and
    estimating a channel noise variance that is responsive to the three intermediate variables.

14. The method of claim 13, further comprising:
    estimating a channel noise variance value based in part on the one or more second order products for the real components and the imaginary components of the received DQPSK symbols.

15. The method of claim 13, wherein estimating a channel amplitude value further comprises:
    first accumulating a first output by adding to the first output the sum of the absolute value of the product of the real component and the imaginary component of each DQPSK symbol received;
    second accumulating a second output by adding to the second output the sum of the square of the real component of each DQPSK symbol received if the product of the real component and the imaginary component of that DQPSK symbol is greater than zero, otherwise to add to its output the sum of the square of the imaginary component of that DQPSK symbol;

third accumulating a third output by adding to the third output the sum of the square of the imaginary component of each DQPSK symbol received if the product of the real component and the imaginary component of that DQPSK symbol is greater than zero, otherwise to add to its output the sum of the square of the real component of that DQPSK symbol; and dividing the square root of the number of received DQPSK symbols into the fourth root of the sum obtained by taking the square of the difference of the output of the step of second accumulating and the output of the step of third accumulating, and then adding four times the square of the output of the step of first accumulating to form said sum.

16. The method of claim 13, wherein estimating a channel phase value further comprises:

first accumulating a first output by adding to the first output the sum of the absolute value of the product of the real component and the imaginary component of each DQPSK symbol received;

second accumulating a second output by adding to the second output the sum of the square of the real component of each DQPSK symbol received if the product of the real component and the imaginary component of that DQPSK symbol is greater than zero, otherwise to add to its output the sum of the square of the imaginary component of that DQPSK symbol;

third accumulating a third output by adding to the third output the sum of the square of the imaginary component of each DQPSK symbol received if the product of the real component and the imaginary component of that DQPSK symbol is greater than zero, otherwise to add to its output the sum of the square of the real component of that DQPSK symbol; and taking the one-half of the inverse cotangent of the quotient obtained by taking the difference between the output of the step of second accumulating and the output of the step of third accumulating, and then dividing that difference by twice the output of the step of first accumulating to form said quotient.

17. The method of claim 14, wherein estimating a channel noise variance value further comprises:

first accumulating a first output by adding to the first output the sum of the absolute value of the product of the real component and the imaginary component of each DQPSK symbol received;

second accumulating a second output by adding to the second output the sum of the square of the real component of each DQPSK symbol received if the product of the real component and the imaginary component of that DQPSK symbol is greater than zero, otherwise to add to its output the sum of the square of the imaginary component of that DQPSK symbol;

third accumulating a third output by adding to the third output the sum of the square of the imaginary component of each DQPSK symbol received if the product of the real component and the imaginary component of that DQPSK symbol is greater than zero, otherwise to add to its output the sum of the square of the real component of that DQPSK symbol; and summing the output of the step of third accumulating with the output of the step of second accumulating, dividing that sum by the number of DQPSK symbols received, subtracting the square of the output of the step of estimating a channel amplitude value, and dividing that difference by two.

18. The method of claim 13, wherein the received DQPSK symbols are received from a multi-carrier communications system.

19. The method of claim 18, wherein the multi-carrier communications system is an orthogonal frequency division multiplexing (OFDM) system.

20. The method of claim 13, wherein the received DQPSK symbols are received from at least one of an Integrated Service Digital Broadcasting-Terrestrial (ISDB-T) compliant system, a Digital Audio Broadcasting (DAB) compliant system, a Digital Multimedia Broadcasting (DMB) compliant system, a HomePlug compliant system, and a Brazilian Digital Television System (SBTVD) compliant system.

21. A non-transitory computer readable media storing instructions that when executed are used to generate a processor adapted to perform the processes of:

estimating a channel amplitude value using a plurality of received DQPSK symbols, wherein the received DQPSK symbols are each characterized by a real component and an imaginary component, and wherein said estimating a channel amplitude value is based in part on three intermediate variables that are each based on one or more second order products of the real components and the imaginary components of the received DQPSK symbols, wherein each of the second order products is a second order product of the real component of a DQPSK symbol and the imaginary component of the same symbol;

estimating a channel phase value based in part on the one or more second order products of the real components and the imaginary components of the received DQPSK symbols; and estimating a channel noise variance that is responsive to the three intermediate variables.

22. The computer readable media of claim 21, wherein the instructions are in a hardware description language (HDL).

23. An apparatus, comprising:

means for accepting a plurality of DQPSK symbols that are each characterized by a real component and an imaginary component and generating three intermediate variables that are each based on one or more second order products of the real components and the imaginary components of the DQPSK symbols, wherein each of the second order products is a second order product of the real component of a DQPSK symbol and the imaginary component of the same symbol;

means for generating an estimate of the channel amplitude based at least in part on the intermediate variables;

means for generating an estimate of the channel phase based at least in part on the intermediate variables; and means for generating an estimate of the channel noise variance that is responsive to the three intermediate variables.

* * * * *